(12) United States Patent
Myers et al.

(10) Patent No.: US 12,540,791 B1
(45) Date of Patent: Feb. 3, 2026

(54) METHOD OF MAKING A GUN HOLSTER

(71) Applicants: James C. Myers, Abilene, TX (US);
Charles Byrd, Porter, TX (US);
William T. Tucker, Conroe, TX (US)

(72) Inventors: James C. Myers, Abilene, TX (US);
Charles Byrd, Porter, TX (US);
William T. Tucker, Conroe, TX (US)

(*) Notice: Subject to any disclaimer, the term of this patent is extended or adjusted under 35 U.S.C. 154(b) by 392 days.

(21) Appl. No.: 18/349,647

(22) Filed: Jul. 10, 2023

Related U.S. Application Data

(63) Continuation-in-part of application No. 16/258,646, filed on Jan. 27, 2019, now abandoned.
(60) Provisional application No. 62/622,892, filed on Jan. 27, 2018.

(51) Int. Cl.
*B29C 65/00* (2006.01)
*F41C 33/02* (2006.01)
*B29C 65/02* (2006.01)
*B29C 65/62* (2006.01)
*B29C 65/70* (2006.01)
*B29C 65/74* (2006.01)

(52) U.S. Cl.
CPC .............. *F41C 33/02* (2013.01); *B29C 65/02* (2013.01); *B29C 65/62* (2013.01); *B29C 65/70* (2013.01); *B29C 65/74* (2013.01)

(58) Field of Classification Search
CPC ......... B29C 65/02; B29C 65/48; B29C 65/62; B29C 65/70; B29C 65/74
See application file for complete search history.

(56) References Cited

U.S. PATENT DOCUMENTS

| 4,340,437 A | 7/1982 | Rogers |
| 9,301,595 B2 | 4/2016 | Tedder |
| 9,310,162 B2 | 4/2016 | Vertreese |

*Primary Examiner* — Philip C Tucker
*Assistant Examiner* — Nickolas R Harm
(74) *Attorney, Agent, or Firm* — Avek IP, LLC

(57) ABSTRACT

A method of making a holster for a gun includes selecting a starting polymer material, a starting leather material, and a gun model; preparing a first side of the polymer material by creating texture on the first side; adhering the polymer material and the leather material together to create a combined material; cutting the combined material into a specific shape as determined by the gun model and a desired holster model; stitching around a perimeter of the cut combined material with a pre-selected thread to render a stitched combined material; heating up the stitched combined material to above a predetermined temperature; forming the stitched combined material to a specific shape associated with the gun model and the holster model; and allowing the stitched combined material to cool into the specific shape associated with the gun model and the holster model to render the holster.

13 Claims, 4 Drawing Sheets

METHOD OF MAKING A GUN HOLSTER

CROSS-REFERENCE TO RELATED APPLICATIONS

This application is a continuation-in-part of U.S. application Ser. No. 16/258,646, filed Jan. 27, 2019, which claims priority to U.S. Provisional Application No. 62/622,892, filed Jan. 27, 2018, both of which are incorporated by reference herein in their entireties.

FIELD OF INVENTION

The disclosure relates generally to gun holsters and methods of making the same. More specifically, the disclosure relates to a method of making a gun holster, wherein the benefits of using both leather and a polymer are included such that an interior layer of the gun holster is composed of leather and an exterior layer is composed of polymer and is configured to retain a rigid structure.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

According to an embodiment of the current disclosure, the invention includes a method of making a holster for a gun, the method comprising the following steps. First, selecting a starting polymer material composed of a thermoplastic polymer and selecting a starting leather material composed of a leather. Then, selecting a gun model for which the holster will be configured to carry. Next, preparing a first side of the starting polymer material by creating texture on the first side. Then, adhering the starting polymer material and the starting leather material together to create a combined material, the combined material being substantially planar in shape. Next, cutting the combined material into a specific shape, the specific shape taking into account the gun model and a desired holster model, thereby rendering a cut combined material. Further, stitching around a perimeter of the cut combined material with a pre-selected thread to render a stitched combined material. Then, heating up the stitched combined material to above a predetermined temperature such that the thermoplastic polymer becomes flexible and forming the stitched combined material to a specific shape associated with the gun model and the holster model while the stitched combined material is heated to at least above the predetermined temperature. Finally, allowing the stitched combined material to cool into the specific shape associated with the gun model and the holster model to render the holster, wherein the leather is positioned on an interior of the holster such that only leather comes into contact with the gun being inserted and removed from the holster.

BRIEF DESCRIPTION OF THE DRAWINGS

Embodiments of the invention are described in detail below with reference to the attached drawings.

The drawings do not limit the invention to the specific embodiments disclosed and described herein. The drawings are not necessarily to scale, emphasis instead being placed upon clearly illustrating various principles of the disclosure.

DETAILED DESCRIPTION

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the technology can include a variety of combinations and/or integrations of the embodiments described herein.

Gun holsters are well known in the art and provide for carrying and transporting of a firearm on a person or within a vehicle, bag, or other locations. Gun holsters, and methods of making the same, vary in a wide range of designs. For example, some gun holsters are composed of a polymer, wherein the polymer is formed to the shape of a particular firearm. These holsters generally provide for tension style retention of the gun due to being formed very specifically to the firearm model. Some of the drawbacks associated with polymer holsters include wear and tear on the gun being inserted and drawn from the firearm due to the rigid nature of the polymer, as well as a noisy draw, again due to the rigid and hard nature of the polymer. Other holsters may be composed substantially of leather, wherein a strap or similar structure is used to retain the gun within the firearm. One of the drawbacks of leather holsters is the need for straps or other hardware to retain the gun within the holster, which is cumbersome during removal and drawing of the gun therefrom.

Accordingly, it is an object of the present invention to overcome at least some of the above-listed problems. Specifically, the present invention provides for a method of making a holster, wherein polymer and leather are both used, such that the polymer allows for creating a specific form, as tailored to a specific gun model, while the leather provides for an interior soft surface such that the firearm is protected from damage. In addition, the leather interior layer provides for a quieter draw as compared to conventional polymer holsters.

Figure 1:
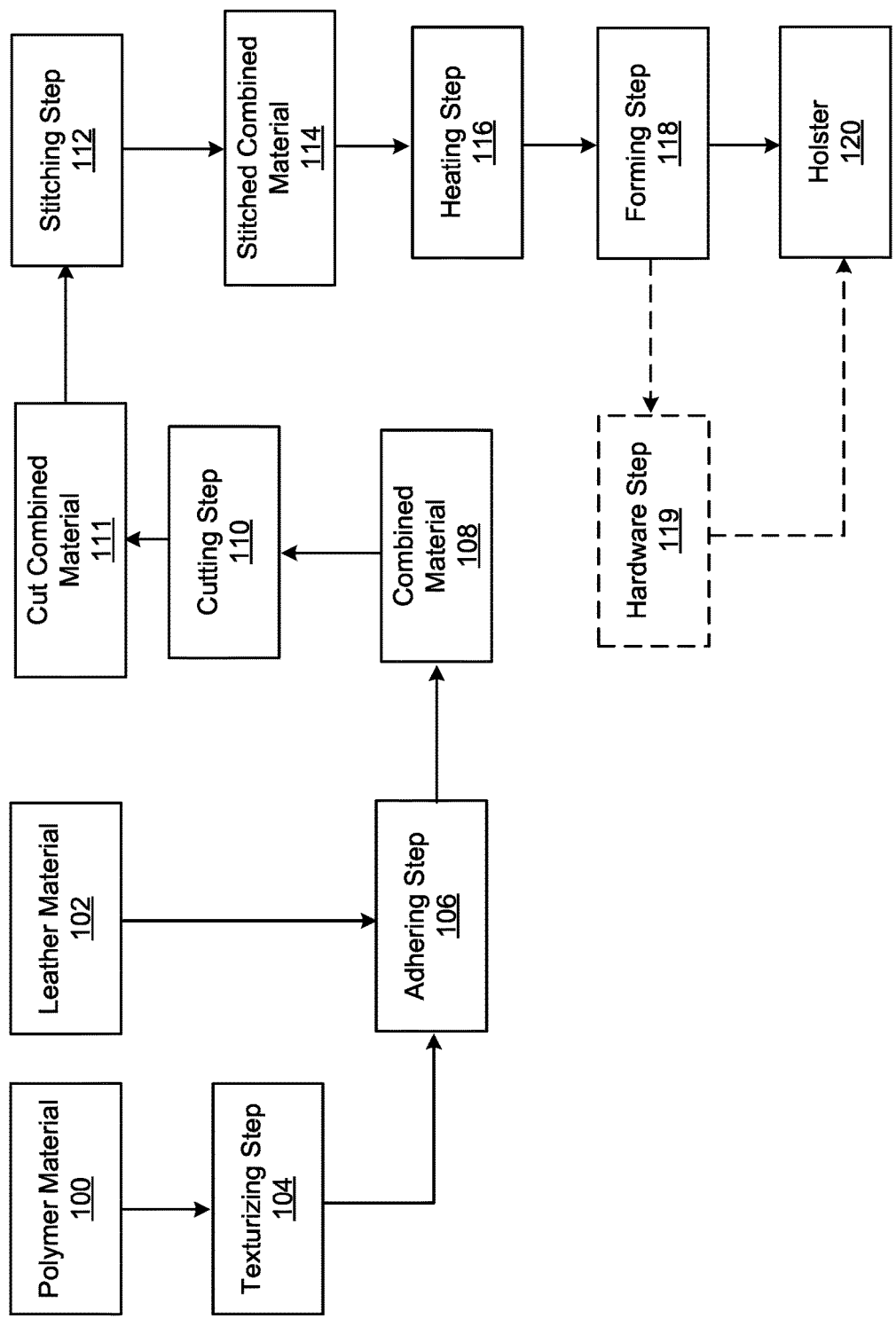
FIG. 1 is a block diagram showing a method of making a gun holster in accordance with the present invention.
Figure 2:
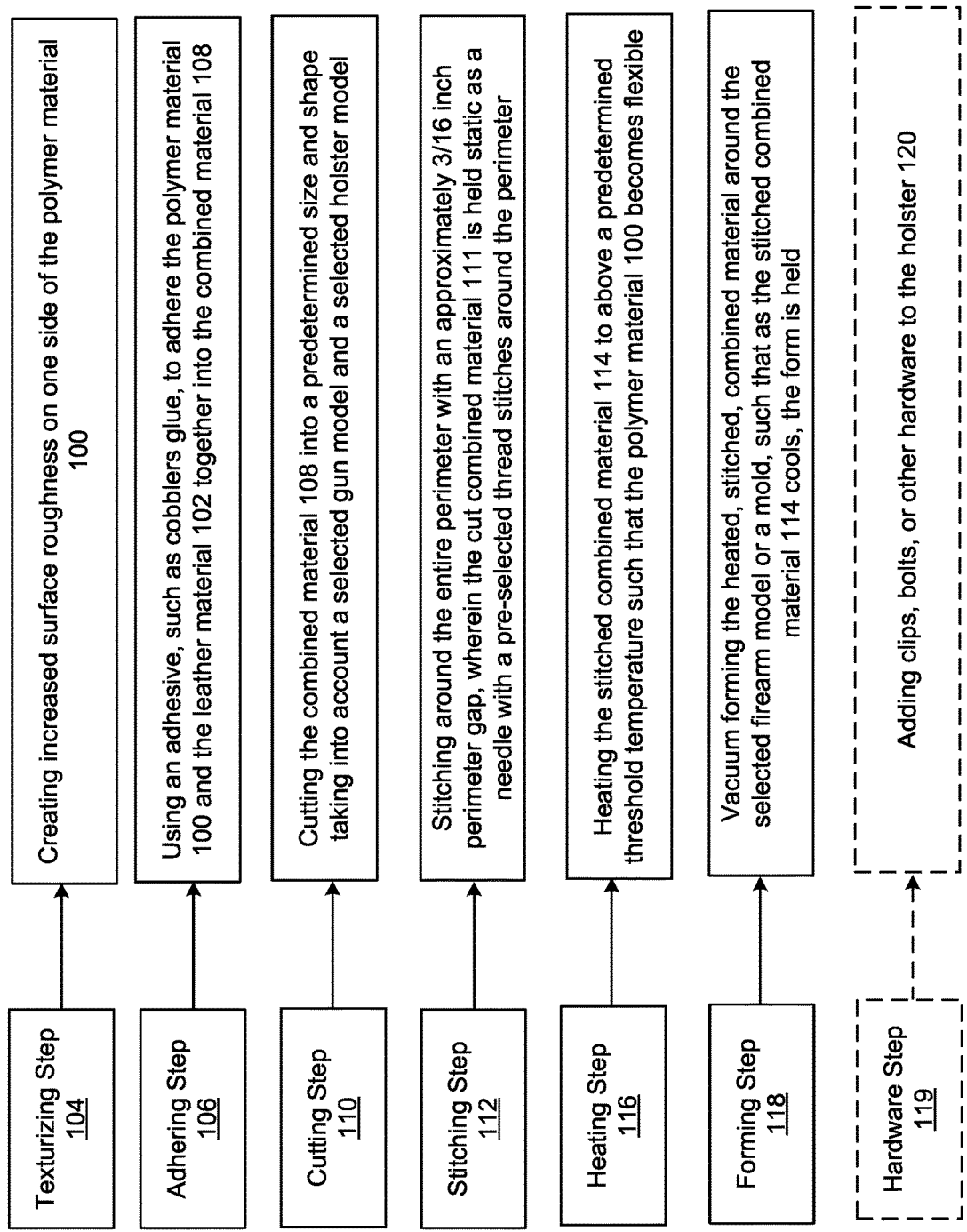
FIG. 2 is a flowchart showing the steps of making a gun holster from FIG. 1.

In FIG. 1, a block diagram depicts a method of making a holster 120 in accordance with the present invention. FIG. 2 depicts a flowchart to elaborate on each step shown in FIG. 1. First, an amount of a polymer material 100 and an amount of a leather material 102 are selected. The polymer material 100 is a thermoplastic polymer which is configured to become flexible upon heating to a predetermined threshold temperature. This allows for the thermoplastic polymer to cool around a particular shape such that once the thermoplastic polymer cools, the shape is retained. Some commercial thermoplastic polymers include Boltaron® and Kydex®, however it is contemplated that other commercial products may be used. The leather material 102, in embodiments, is 2-3 ounce leather, however it is again contemplated that varying thicknesses may be used.

Once the amount of the polymer material 100 and the leather material 102 are selected, the polymer material 100 is subjected to a texturizing step 104. As shown in FIG. 2, the texturizing step 104 involves creating an increased surface roughness on one side of the polymer material. This may be completed with any tool as would be understood by those skilled in the art, wherein the tool is used to roughen the one side of the polymer material 100 such that the surface roughness increases. This provides for an improved grip during the next step of the manufacturing process.

After the texturizing step 104, the polymer material 100 and the leather material 102 are adhered together in an adhering step 106 to form a combined material 108. The combined material 108 is substantially planar at this step. In other words, the polymer material 100 and the leather material 102 are both flat prior to the adhering step, therefore the combined material 108 is also substantially flat and planar. As shown in FIG. 2, the adhering step 106 uses an adhesive, such as cobbler's glue/shoemaker's cement, to adhere the two materials together. Other adhesives may be selected, however, cobbler's glue/shoemaker's cement has shown to provide for a durable and effective adherence between the two. The adhesive will be fully and evenly spread, such as by hand or by a machine, between the two materials such that no areas between the two materials are adhesive free. This ensures that a complete bond is created between the two materials to create the combined material 108.

The combined material 108 then moves on to a cutting step 110 wherein the combined material 108 is cut into a cut combined material 111. As shown in FIG. 2, the cutting step 110 takes into account a specific gun model and a specific holster model. For example, holsters may vary such being classified as an in the waistband holster, a tuckable holster, an outside of the waistband holster, etc. The cutting step 110 may be completed by hand, with a machine, or with a saw. For example, a hold and press machine may be used, wherein the combined material 108 is laid on a surface and a button, lever, or other activator is used to punch/press out the desired shape. Alternatively, a band saw, or similar saw may be used to cut out the predetermined shape.

After the cutting step 110, the cut combined material 111 is stitched in a stitching step 112 resulting in a stitched combined material 114. As shown in FIG. 2, during the stitching step 112, a machine is used to stitch around the cut combined material 114 with a pre-selected thread. The pre-selected thread may vary, but in embodiments, is a polyester thread. Alternative embodiments may use nylon threads. Further, in embodiments, a thread weight of 277 is used for a top, while a thread weight of 207 is used for the bottom.

It should further be understood that a sewing machine is used for the stitching step 112, the sewing machine specifically being a compound sewing machine, wherein a foot of the sewing machine always remains in contact with the cut combined material 111, the cut combined material 111 remaining static, as the needle moves about the cut combined material 111. In other words, so that the cut combined material 111 does not slip or move in an unwanted manner, the machine is specifically designed to hold the material 111 static and sew around the material.

In embodiments, an entire perimeter of the cut combined material 111 receives stitching such that an approximately 3/16-inch perimeter gap is created. The stitching step 112, as well as the adhering step 106 create a tight bond and connection between the polymer material 100 and the leather material 102 such that the resulting holster 120 will remain intact during extensive use.

After the stitching step 112, the stitched combined material 114 is exposed to heat in a heating step 116. As shown in FIG. 2, as the stitched combined material 114 is heated above a threshold temperature, as selected for the specific thermoplastic polymer, the stitched combine material 114 becomes flexible. While heated, the stitched combined material 114 is formed and allowed to cool during a forming step 118. As shown in FIG. 2, in embodiments, a vacuum forming machine is used to form the heated, stitched combined material around either a firearm or a firearm mold, such that the stitched combined material 114 takes on the shape of the specific firearm model. Once cooled, the shape is retained, resulting in the holster 120.

In embodiments, a hardware step 119 may take place, such as shown in FIG. 2, to add clips, bolts, or other hardware to the holster 120.

Figure 3:
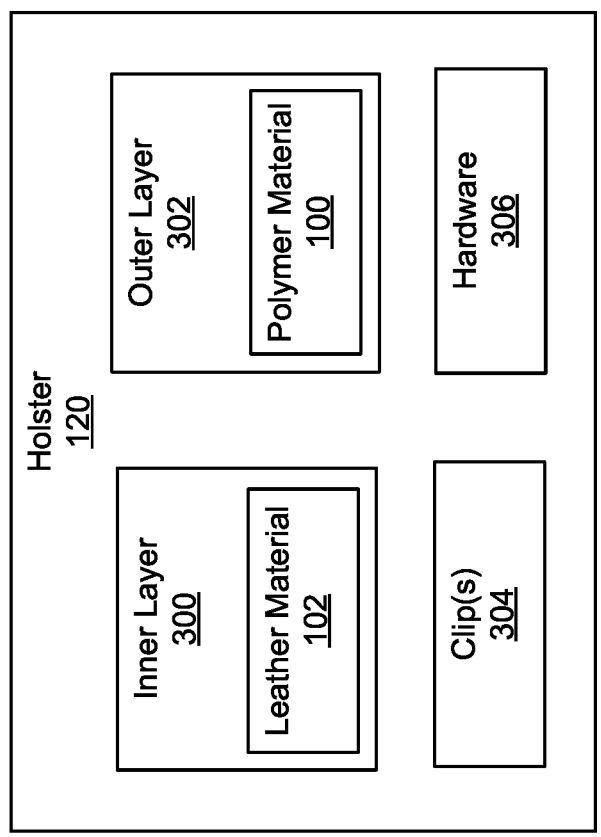
FIG. 3 is a block diagram of the features of a gun holster as created through the method of FIG. 1.

In FIG. 3 a schematic of the holster 120 is shown. The holster 120 having an inner layer 300 composed of the leather material 102 and an outer layer 302 composed of the polymer material 100. In embodiments, one or more clips 304 are added as well as additional hardware 306. The resulting holster 120 provides for improvements over the art by having the benefits of a polymer holster, such that the rigid structure of the holster is maintained, but by adding the leather material 102 to the inner layer 300, the gun is protected. The holster 120 does not require retaining straps or other elements to keep the gun retained therein due to the rigid structure of the polymer material 100.

Figure 4:
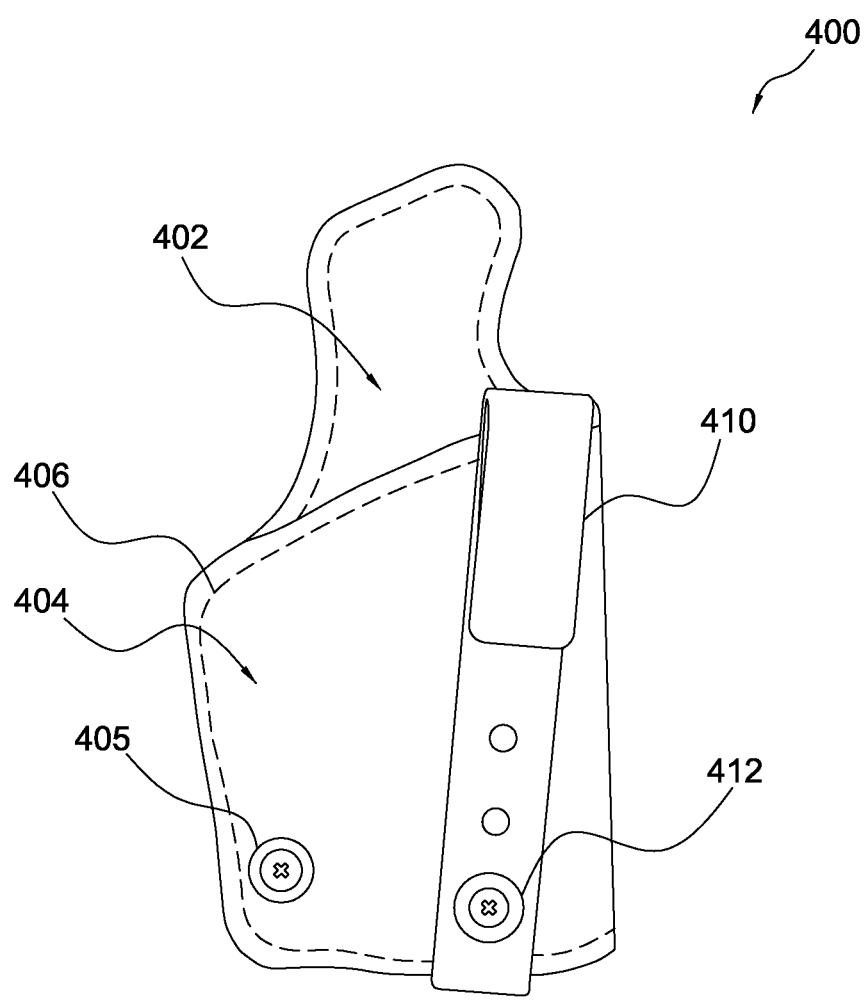
FIG. 4 is a front view of the gun holster as created through the method of FIG. 1.

In FIG. 4, an example of a holster 400 as made through the method of the present invention is shown. Holster 400 having an inner layer 402 composed of leather, an outer layer 404 composed of a polymer, and stitching 406 extending around an entire periphery of the holster. Not shown is the adhesive between the layers. The holster 400 may include a clip 410 secured thereto via one or more bolts 412 and may also include one or more retaining bolts 405 to keeping the holster 400 in the folded position. Again, holster 400 is merely shown for example and different shapes and styles of holsters may be made by the method of the present invention.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure. It will be understood that certain features and subcombinations are of utility and may be employed without reference to other features and subcombinations. Not all steps listed in the various figures need be carried out in the specific order described.

The invention claimed is:
1. A method of making a holster for a gun, the method comprising:
    selecting a starting polymer material composed of a thermoplastic polymer;

selecting a starting leather material composed of a leather;
selecting a gun model for which the holster will be configured to carry;
preparing a first side of the starting polymer material by creating texture on the first side;
adhering the starting polymer material and the starting leather material together to create a combined material, the combined material being substantially planar in shape;
cutting the combined material into a specific shape, the specific shape taking into account the gun model and a desired holster model, thereby rendering a cut combined material;
stitching around a perimeter of the cut combined material with a pre-selected thread to render a stitched combined material;
heating up the stitched combined material to above a predetermined temperature such that the thermoplastic polymer becomes flexible;
forming the stitched combined material to a specific shape associated with the gun model and the holster model while the stitched combined material is heated to at least above the predetermined temperature; and
allowing the stitched combined material to cool into the specific shape associated with the gun model and the holster model to render the holster;
wherein the leather is positioned on an interior of the holster such that only leather comes into contact with the gun while being inserted and removed from the holster.

2. The method of claim 1, wherein adhering the starting polymer material and the starting leather material together comprises gluing the starting polymer material and the starting leather material together with a shoemaker cement.

3. The method of claim 1, wherein preparing the first side of the starting polymer material comprises roughing the first side to increase a surface roughness.

4. The method of claim 3, wherein roughing the first side is done with a machine.

5. The method of claim 1, wherein cutting the combined material into the specific shape is done with a hold and press machine.

6. The method of claim 1, wherein cutting the combined material into the specific shape is done with a band saw.

7. The method of claim 1, wherein the preselected thread is selected from a group consisting of a polyester thread and a nylon thread.

8. The method of claim 1, wherein the preselected thread comprises a top thread and a bottom thread, the top thread having a 277 weight and the bottom thread having a 207 weight.

9. The method of claim 1, wherein the stitching around the perimeter of the cut combined material with the pre-selected thread comprises stitching fully around the perimeter of the cut combined material with an approximately 3/16 inch perimeter gap.

10. The method of claim 1, further comprising:
adding a clip to the holster.

11. The method of claim 1, wherein forming the stitched combined material to the specific shape associated with the gun model and the holster model while the stitched combined material is heated to at least above the predetermined temperature; and allowing the stitched combined material to cool into the specific shape associated with the gun model and the holster model to render the holster comprises:
using a vacuum press to position the stitched combined material adjacent to the gun and activate the vacuum press to form the stitched combined material around the gun.

12. The method of claim 1, wherein the leather is approximately 2-3 ounce leather.

13. The method of claim 1, wherein stitching around the perimeter of the cut combined material with the pre-selected thread to render the stitched combined material further comprises:
holding the cut combined material static; and
moving a needle with the pre-selected thread around the perimeter of the cut combined material while the cut combined material remains static.

* * * * *